US012754547B2

(12) United States Patent
Lee et al.

(10) Patent No.: US 12,754,547 B2
(45) Date of Patent: Oct. 6, 2026

(54) AUTONOMOUS DRIVING MOBILE SERVICE ROBOT WAREHOUSING AND DELIVERY SYSTEM

(71) Applicant: IROVA Co., Ltd., Daegu (KR)

(72) Inventors: Bae Hee Lee, Daegu (KR); Yu Seong Kwak, Daegu (KR)

(73) Assignee: IROVA Co., Ltd., Daegu (KR)

( * ) Notice: Subject to any disclaimer, the term of this patent is extended or adjusted under 35 U.S.C. 154(b) by 476 days.

(21) Appl. No.: 17/978,771

(22) Filed: Nov. 1, 2022

(65) Prior Publication Data

US 2023/0213938 A1 Jul. 6, 2023

(30) Foreign Application Priority Data

Dec. 31, 2021 (KR) ........................ 10-2021-0194234

(51) Int. Cl.
*G05D 1/00* (2024.01)
*B65G 1/06* (2006.01)

(52) U.S. Cl.
CPC ........... *G05D 1/0088* (2013.01); *B65G 1/065* (2013.01); *G05D 1/0027* (2013.01)

(58) Field of Classification Search
CPC .. G05D 1/0088; G05D 1/0027; G05D 1/0297; B65G 1/065; G06Q 2220/00; G06Q 10/02; G06Q 10/063; G06Q 50/40; G06Q 10/08; G06Q 10/087; G06Q 10/047; G06Q 10/0631; Y02P 90/02; H04W 4/029; B25J 11/008; H04L 41/045; H04L 47/50
USPC ..... 700/245, 258; 705/7.12, 7.17, 7.22, 7.25
See application file for complete search history.

(56) References Cited

U.S. PATENT DOCUMENTS

| | | | | |
|---|---|---|---|---|
| 8,972,045 | B1 * | 3/2015 | Mountz | G06Q 10/087 |
| 9,459,933 | B1 * | 10/2016 | Halim | G06F 9/52 |
| 9,904,285 | B2 * | 2/2018 | Kuhara | G05D 1/0219 |
| 2003/0037515 | A1 * | 2/2003 | Herzog | B65B 5/105 |
| 2014/0214195 | A1 * | 7/2014 | Worsley | G05D 1/0287 |
| 2016/0236869 | A1 * | 8/2016 | Kimura | B65G 1/1378 |
| 2018/0276608 | A1 * | 9/2018 | Stadie | B65G 1/1378 |
| 2018/0364719 | A1 * | 12/2018 | Wang | G06F 16/22 |
| 2022/0185340 | A1 * | 6/2022 | Hidaka | G08G 1/146 |
| 2022/0187847 | A1 * | 6/2022 | Cella | G06Q 10/06 |
| 2022/0410399 | A1 * | 12/2022 | Yoshikuwa | B25J 5/007 |

FOREIGN PATENT DOCUMENTS

| | | | | | |
|---|---|---|---|---|---|
| JP | 2015219811 | A | * | 12/2015 | |
| JP | 2018204373 | A | * | 12/2018 | |
| KR | 10-2016-0088264 | A | | 7/2016 | |
| KR | 10-2019-0109804 | A | | 9/2019 | |
| KR | 10-2021-0119887 | A | | 10/2021 | |
| WO | WO-2018077031 | A1 | * | 5/2018 | G06Q 10/06 |

* cited by examiner

*Primary Examiner* — Ellis B. Ramirez
(74) *Attorney, Agent, or Firm* — Hauptman Ham, LLP

(57) ABSTRACT

The present invention relates to an autonomous driving mobile service robot warehousing and delivery system that is capable of systematically storing and delivering a plurality of robot bodies from line parts by means of a server and comparing the number of delivery times of the robot bodies by line part to allow the robot bodies to be delivered sequentially from the line part having the smallest number of delivery times, thereby distributing the usage rate of the robot bodies disposed by line part.

6 Claims, 5 Drawing Sheets

AUTONOMOUS DRIVING MOBILE SERVICE ROBOT WAREHOUSING AND DELIVERY SYSTEM

CROSS REFERENCE TO RELATED APPLICATION

The present application claims the benefit of Korean Patent Application No. 10-2021-0194234, filed on Dec. 31, 2021, in the Korean Intellectual Property Office, the entire contents of which are incorporated herein by reference in its entirety.

BACKGROUND OF THE INVENTION

Technical Field

The present invention relates to an autonomous driving mobile service robot warehousing and delivery system, and more specifically, to an autonomous driving mobile service robot warehousing and delivery system that is capable of systematically storing and delivering a plurality of robot bodies from line parts by means of a server and comparing the number of delivery times of the robot bodies by line part to allow the robot bodies to be delivered sequentially from the line part having the smallest number of delivery times, thereby distributing the usage rate of the robot bodies disposed by line part.

Background of the Related Art

Recently, many interests in mobility vehicles as transportation means having the ability to move freely have been developed, and such mobility vehicles are adequate for transportation means within a near distance or specific region because they are not influenced by traffic jam. Most of them are driven with electric energy, but with internal combustion engines, thereby advantageously causing no environmental pollution. Representative mobility vehicles include segways, wheel electric scooters, electric kickboards, and the like, and further, mobility service robots available in a golf course have been recently developed as golf carts.

There are a manual mode and an automatic mode in the driving mode of the golf cart. In the manual mode, a steering wheel, an accelerator, a brake, and the like are controlled by a driver of the golf cart so that he or she controls golf cart driving for himself and herself, and in the automatic mode, the golf cart is autonomously driven by means of various control devices mounted thereon, irrespective of the driver's control.

At present, lots of mobility technologies have been developed to allow autonomous driving mobility vehicles to be delivered from parking lots or warehouses and thus moved to their users through their autonomous driving, without being driven by drivers.

One of the conventional mobility technologies is disclosed in Korean Patent Application Laid-open No. 10-2016-0088264 wherein an autonomous driving vehicle hailing system for moving an autonomous driving vehicle to a user's desired position to allow him or her to hail the vehicle. In specific, the autonomous driving vehicle hailing system, which is mounted inside the autonomous driving vehicle or in a navigation device or autonomous driving control system, includes an autonomous driving vehicle hailing controller configured to input a hailing position name frequently used by means of a touch screen or voice, search and store the position name in GPS or navigation, store the position information by means of external cameras of the autonomous driving vehicle, store parking lot numbers and hailing position images if the hailing position is an underground parking lot or tower parking lot, allow a hailing controller to automatically obtain final getting off position information by means of the GPS and navigation and the camera functions of the autonomous driving control system after the user gets off from the autonomous driving vehicle if a standby place is the final getting off place, store the position information as position information on a "final getting off place" blank, receive a new place name by means of the user's voice or text if the standby place is a designated place by him or her, search and obtain the received place by means of the GPS and navigation, check the hailing position if hailing position information is received from his or her smartphone or wearable device by means of his or her voice or text or if a hailing command is received from him or her, provide the position information to the navigation device or autonomous driving control system of the autonomous driving vehicle, allow him or her to hail the autonomous driving vehicle to the designated position, and transmit the hailing of the autonomous driving vehicle to his or her smartphone by means of wireless communication means; and an autonomous driving vehicle hailing application mounted in his or her smartphone or wearable device to store the hailing position name frequently used, which is stored in the autonomous driving vehicle hailing controller, and to transmit his or her desired hailing position information to the autonomous driving vehicle hailing controller.

Another conventional mobility technology is disclosed in Korean Patent Application Laid-open No. 10-2019-0109804 wherein autonomous driving vehicle hailing service method includes the steps of: allowing a user terminal to request a service log record using a vehicle hailing service to a service execution server; allowing the service execution server to request the authentication for the service log record to an authentication management server in response to the request; allowing the authentication management server to generate transaction information for verification in response to the authentication request for the service log record and then transmit the generated transaction information for verification to a block chain server; and allowing the block chain server to perform the authentication for the transaction information for verification, and if the authentication successes, transmitting a transaction identifier for the transaction information for verification to the service execution server.

Yet another conventional mobility technology is disclosed in Korean Patent Application Laid-open No. 10-2021-0119887 wherein a robot control system disposed in a robot to control the robot includes: a control module for controlling the robot to allow the robot to move along a predetermined autonomous driving path in an autonomous driving mode; a mode switching module for switching the autonomous driving mode to a moving path resetting mode if a given switching condition is satisfied while the robot is being in the autonomous driving mode; and a setting module for tracking, if the robot moves by an external force in the moving path resetting mode, the moving path of the robot while the robot is moving by the external force, and resetting the autonomous driving path, based on the tracked moving path.

The above-mentioned conventional technologies relate to the autonomous driving mobility vehicles that are moved to the users under the hailing requests of the users, but a technology wherein a plurality of mobility vehicles such as golf carts disposed in a specific region like a golf course are stored and delivered in and from the specific region has been not suggested and developed at all. Therefore, there is a definite need to develop a new system for systematically managing a large number of mobility vehicles.

SUMMARY OF THE INVENTION

Accordingly, the present invention has been made in view of the above-mentioned problems occurring in the related art, and it is an object of the present invention to provide an autonomous driving mobile service robot warehousing and delivery system that is configured to have line parts, units, robot bodies, and a server having a delivery information transmitter for calculating the information of the number of robot bodies required according to a user's registration and use information to transmit delivery information to receivers, a warehousing information transmitter for transmitting warehousing information to the receivers according to the user's return request of the delivered robot bodies, and a delivery number receiver for receiving the information of the number of delivery times from counting parts, so that by means of the server, the robot bodies can be systematically stored and delivered in and from the line parts, and configured to have the counting parts adapted to count the number of delivery times of the robot bodies from the respective line parts to transmit the information of the number of delivery times to the delivery number receiver, so that the delivery information transmitter operates cooperatively with the delivery number receiver and compares the number of delivery times by line part that is counted by the counting parts to allow the robot bodies to be delivered sequentially from the units of the line part having the smallest number of delivery times.

To accomplish the above-mentioned objects, according to the present invention, there is provided an autonomous driving mobile service robot warehousing and delivery system including: one or more line parts; robot bodies disposed on each line part and manually driven by a user's control or autonomously driven by control modules; the control modules disposed on the corresponding robot bodies to provide position information of the robot bodies, receive warehousing and delivery information of the robot bodies from a server, and control driving of the robot bodies in response to the received information to store the robot bodies in the line parts or deliver the robot bodies from the line parts; the server for calculating information of the number of robot bodies required according to the user's registration and usage information, transmitting delivery information to the control modules, transmitting warehousing information to the control modules according to the user's return request of the delivered robot bodies, receiving information of the number of delivery times from counting parts, comparing the number of delivery times by line part counted by the counting parts, and transmitting the compared results to the control modules to allow the robot bodies to be delivered sequentially from the line part having the smallest number of delivery times; and the counting parts for counting the number of delivery times of the robot bodies from the respective line parts to transmit the information of the number of delivery times to the server.

According to the present invention, desirably, each line part may include units formed of sections Nos. 1 to N lined up by compartment thereof, the robot bodies being located on the units, and each control module may include a sensor for providing position information of the corresponding robot body, a receiver having a delivery information receiver for receiving delivery information of the corresponding robot body from the server and an warehousing information receiver for receiving warehousing information of the corresponding robot body from the server, and a driving controller for controlling driving of the corresponding robot body to deliver the corresponding robot body from the corresponding unit or store the corresponding robot body in the corresponding unit, based on the information received from the receiver.

According to the present invention, desirably, the server may include a delivery information transmitter for calculating the information of the number of robot bodies required according to the user's registration and usage information to transmit the delivery information to the delivery information receivers, a warehousing information transmitter for transmitting the warehousing information to the warehousing information receivers according to the user's return request of the delivered robot bodies, and a delivery number receiver for receiving the information of the number of delivery times from the counting parts, and the delivery information transmitter may operate cooperatively with the delivery number receiver, compare the number of delivery times by line part counted by the counting parts, and transmit the compared results to the delivery information receivers to allow the robot bodies to be delivered sequentially from the units of the line part having the smallest number of delivery times.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE PREFERRED EMBODIMENTS

The present invention relates to an autonomous driving mobile service robot warehousing and delivery system that is capable of systematically storing and delivering a plurality of robot bodies from line parts by means of a server and comparing the number of delivery times of the robot bodies by line part to allow the robot bodies to be delivered sequentially from the line part having the smallest number of delivery times, thereby distributing the usage rate of the robot bodies disposed by line part.

Now, an explanation of a configuration and operations of an autonomous driving mobile service robot warehousing and delivery system according to the present invention will be given in detail with reference to FIGS. 1 to 5.

Figure 1:
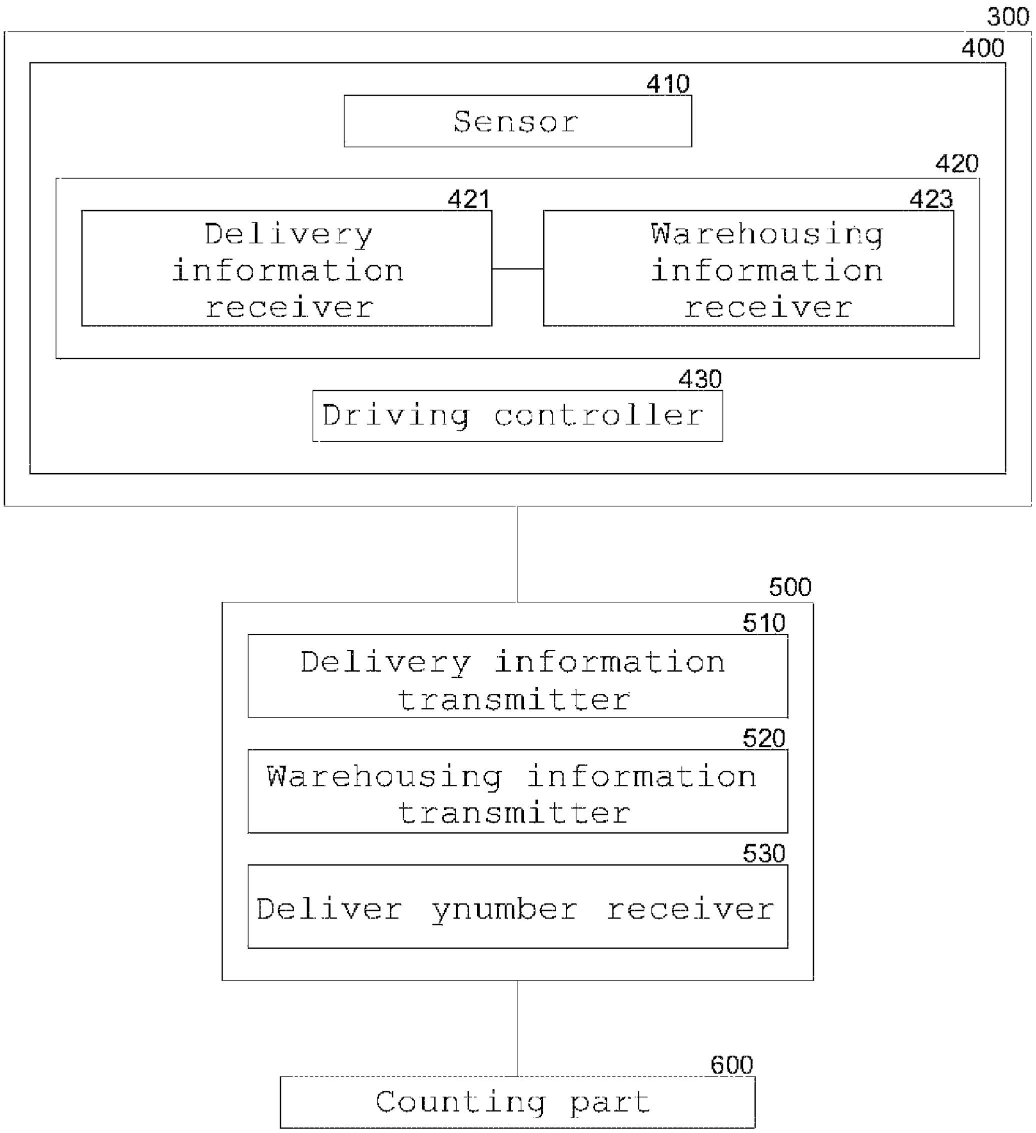
FIG. 1 is a schematic block diagram showing a configuration of an autonomous driving mobile service robot warehousing and delivery system according to the present invention.
Figure 2:
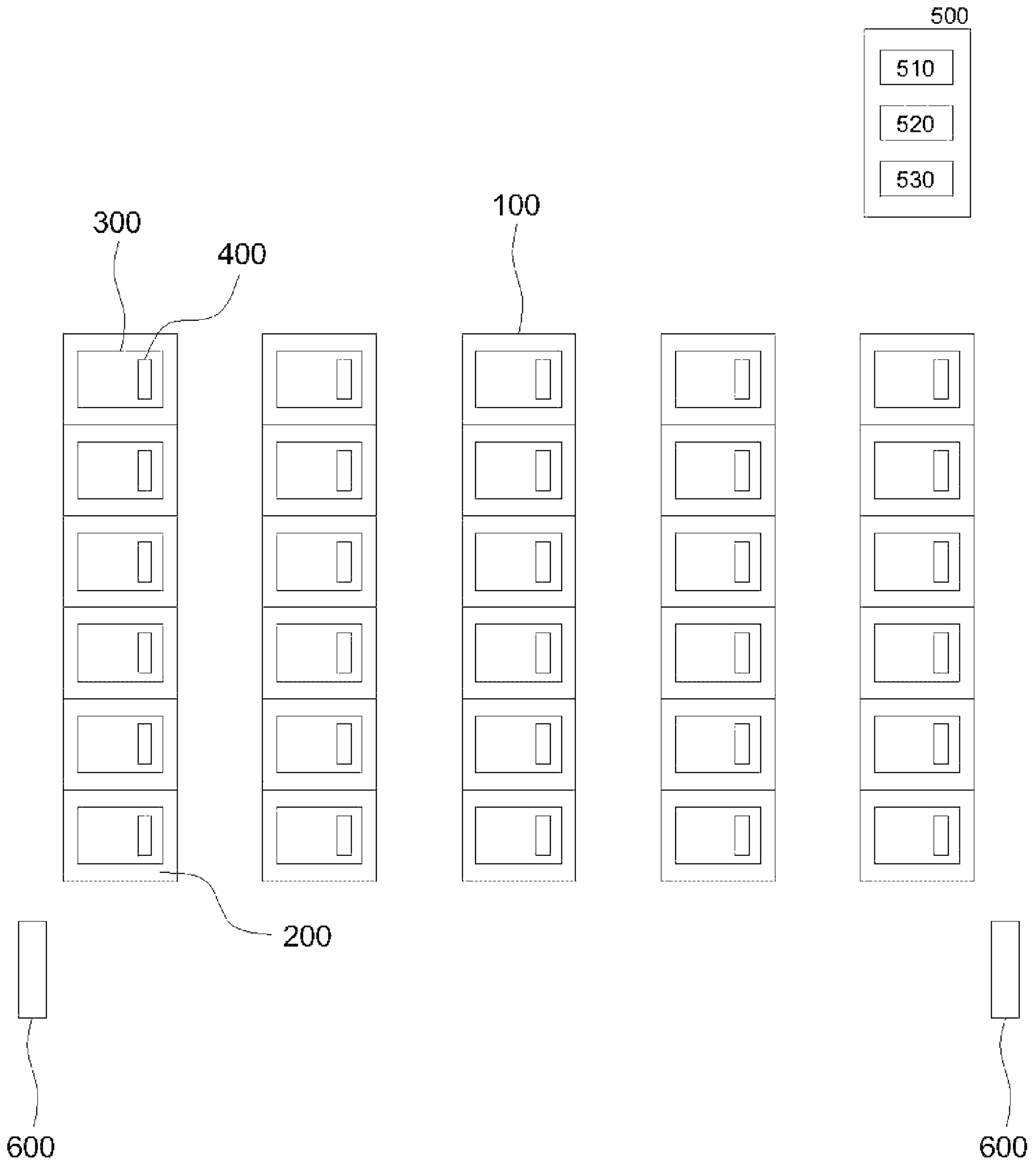
FIG. 2 is an exemplary view showing a use state of the autonomous driving mobile service robot warehousing and delivery system according to the present invention.
Figure 3:
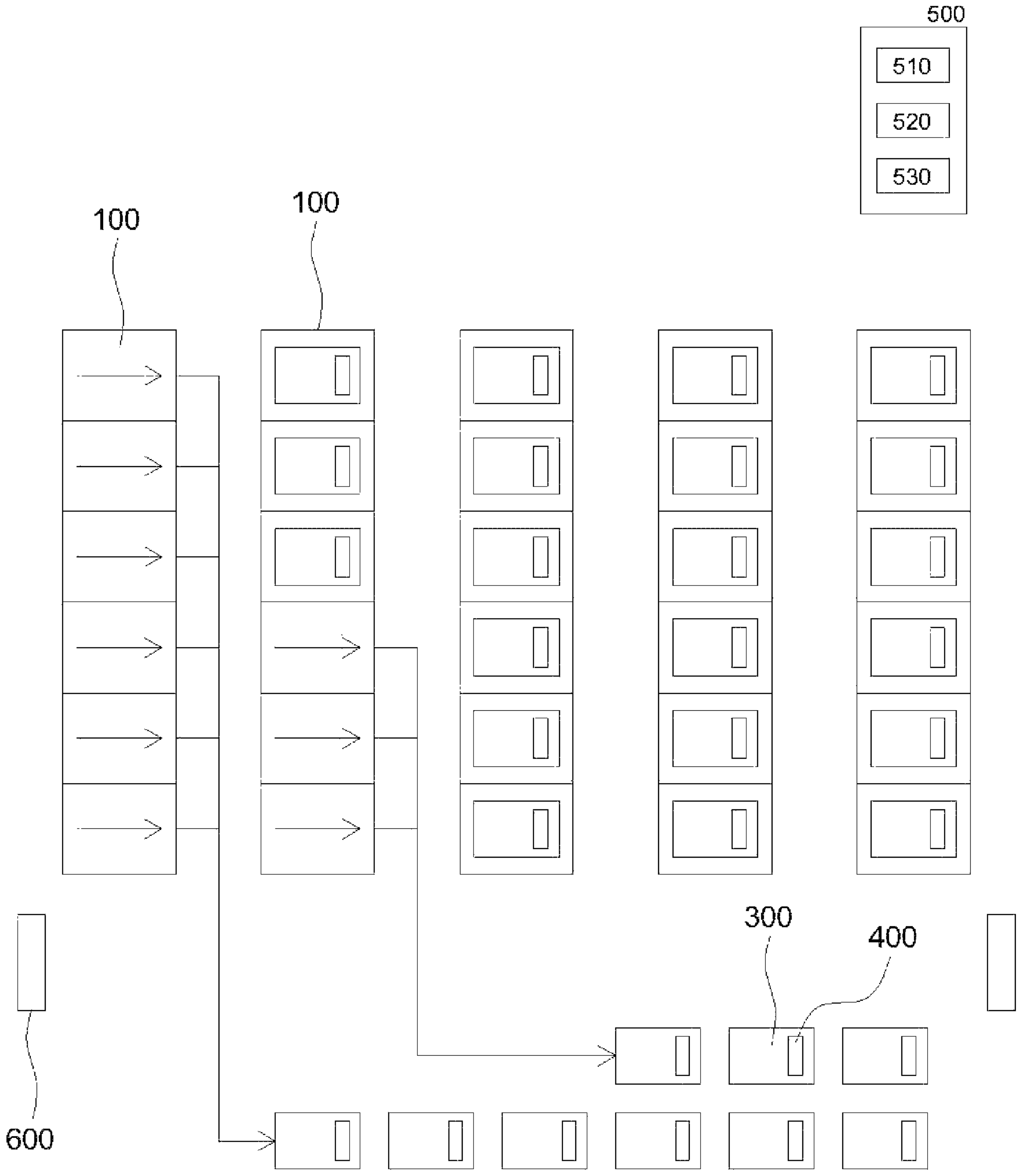
FIG. 3 is an exemplary view showing a state where robot bodies are delivered by means of driving controllers of the system according to the present invention.
Figure 4:
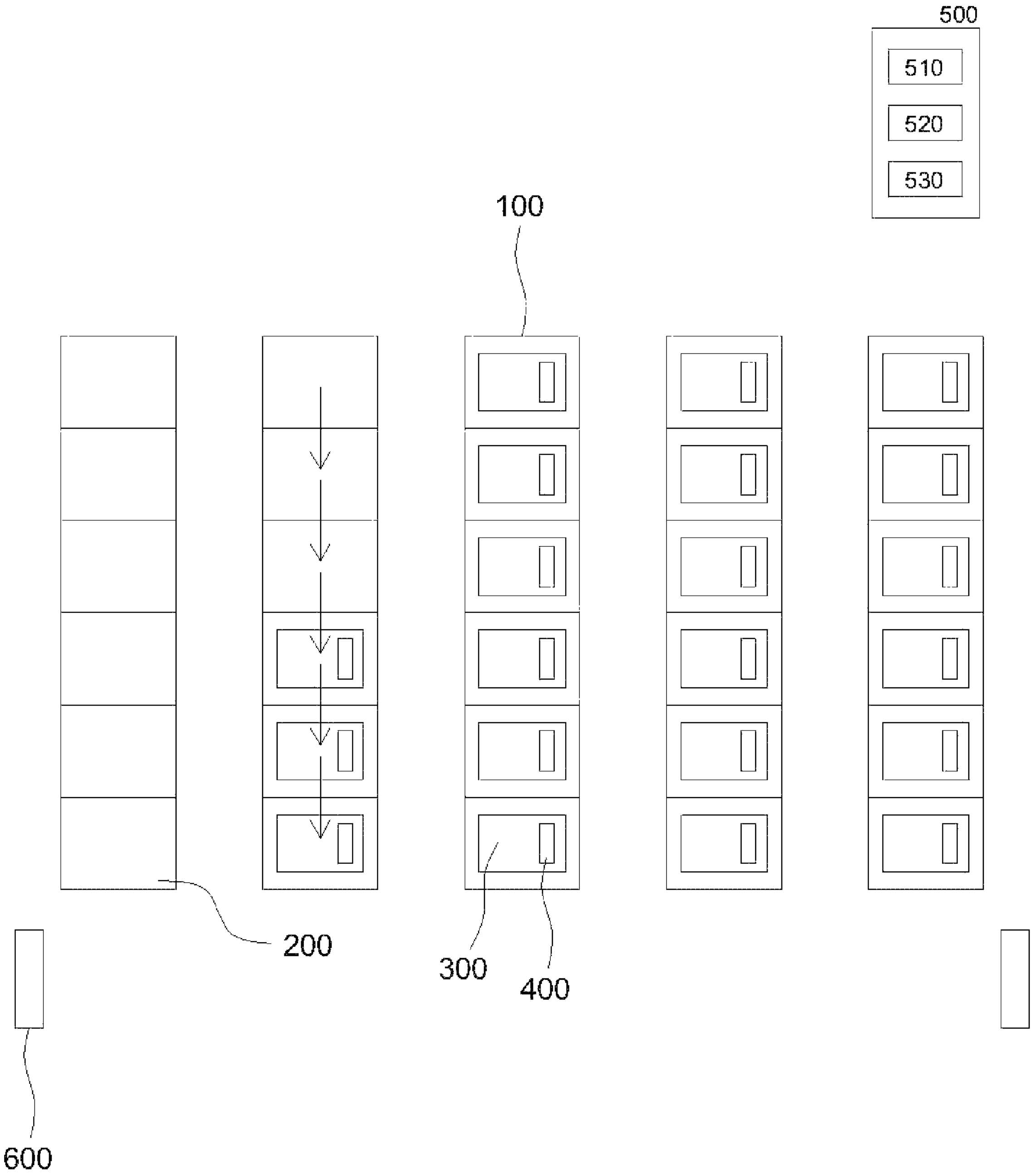
FIG. 4 is an exemplary view showing a state where robot bodies are arranged by means of arrangement controllers of the system according to the present invention.
Figure 5:
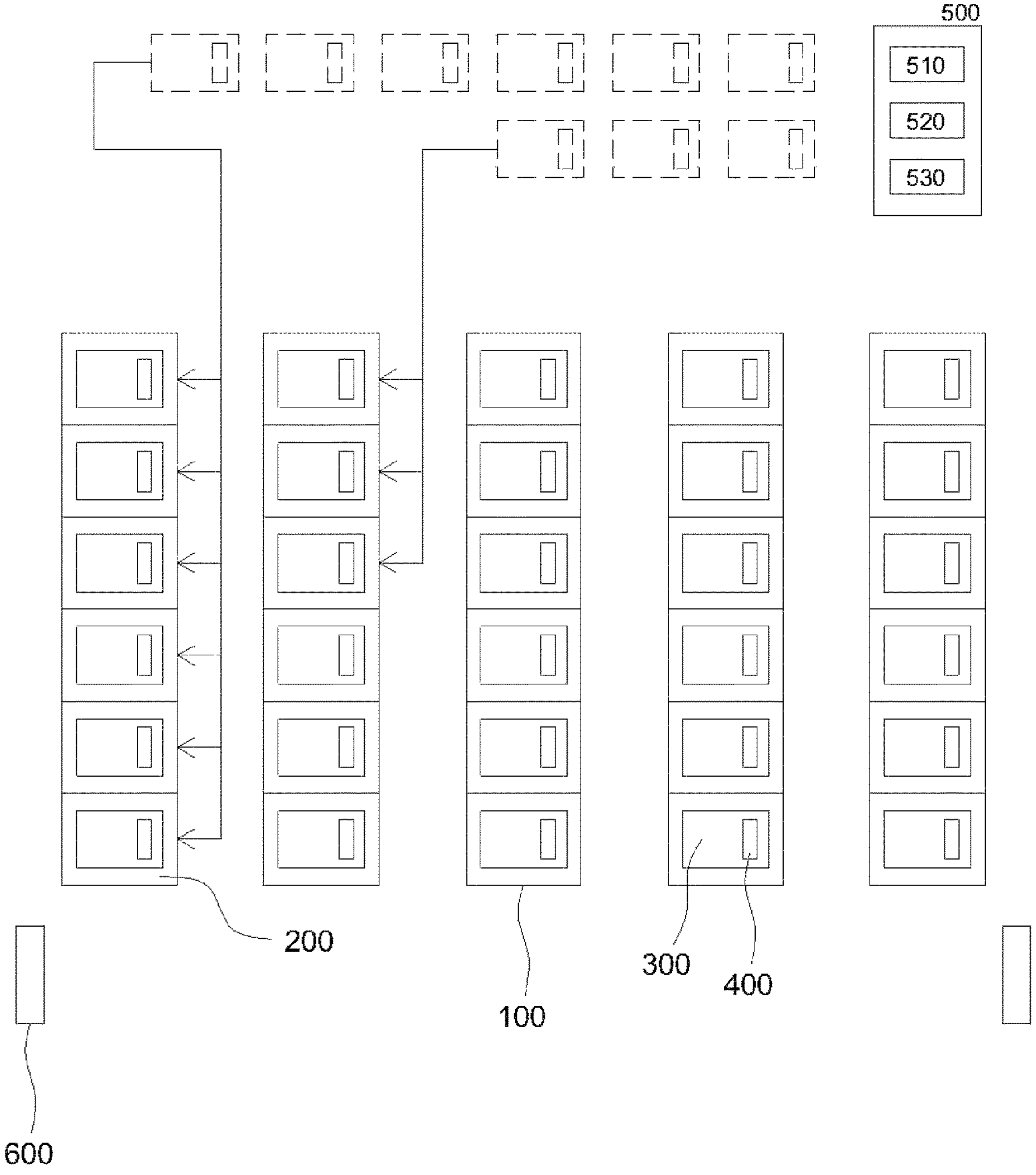
FIG. 5 is an exemplary view showing a state where robot bodies are stored by means of the driving controllers of the system according to the present invention.

Referring first to FIGS. 1 and 2, an autonomous driving mobile service robot warehousing and delivery system according to the present invention includes: one or more line parts 100; robot bodies 300 disposed on each line part 100 and manually driven by a user's control or autonomously driven by control modules 400; the control modules 400 disposed on the corresponding robot bodies 300 to provide position information of the robot bodies 300, receive warehousing and delivery information of the robot bodies 300 from a server 500, and control driving of the robot bodies 300 in response to the received information to store the robot bodies 300 in the line parts 100 or deliver the robot bodies 300 from the line parts 100; the server 500 for calculating information of the number of robot bodies 300 required according to the user's registration and usage information, transmitting delivery information to the control modules 400, transmitting warehousing information to the control modules 400 according to the user's return request of the delivered robot bodies 300, receiving information of the number of delivery times from counting parts 600, comparing the number of delivery times by line part 100 counted by the counting parts 600, and transmitting the compared results to the control modules 400 to allow the robot bodies 300 to be delivered sequentially from the line part 100 having the smallest number of delivery times; and the counting parts 600 for counting the number of delivery times of the robot bodies 300 from the respective line parts 100 to transmit the information of the number of delivery times to the server 500.

Under the above-mentioned configuration, an explanation of the system according to the present invention will be given in more detail below. One or more line parts 100 are spaced apart from one another at given intervals in a transverse direction so that the robot bodies 300 disposed in units 200 as will be discussed later are gently delivered and stored therefrom and therein.

The units 200 are provided by the compartment of each line part 100.

In this case, the units 200 are desirably formed of sections Nos. 1 to N lined up by the compartment of each line part 100, so that spaces where the line parts 100 and the units 200 are built can be provided and efficient delivery and warehousing of the robot bodies 300 located in the respective units 200 are achieved.

The robot bodies 300 are located in the respective units 200 and manually driven by the user's control or autonomously driven by the control modules 400.

The control modules 400 are disposed in the corresponding robot bodies 300, and each control module 400 includes a sensor 410 for providing position information of the corresponding robot body 300, a receiver 420 having a delivery information receiver 421 for receiving delivery information of the corresponding robot body 300 from the server 500 and an warehousing information receiver 423 for receiving warehousing information of the corresponding robot body 300 from the server 500, and a driving controller 430 for controlling driving of the corresponding robot body 300 to deliver the corresponding robot body 300 from the corresponding unit 200 or store the corresponding robot body 300 in the corresponding unit 200, based on the information received from the receiver 420.

In this case, the sensor 410 is used with a variety of sensors such as GPS, LiDAR, beacon, Radio Frequency (RF), and the like.

The server 500 includes a delivery information transmitter 510 for calculating the information of the number of robot bodies 300 required according to the user's registration and usage information to transmit the delivery information to the delivery information receivers 421, a warehousing information transmitter 520 for transmitting the warehousing information to the warehousing information receivers 423 according to the user's return request of the delivered robot bodies 300, and a delivery number receiver 530 for receiving the information of the number of delivery times from the counting parts 600.

The counting parts 600 count the number of delivery times of the robot bodies 300 from the respective line parts 100 to transmit the information of the number of delivery times to the delivery number receiver 530.

In this case, each counting part 600 is desirably located at one side in front of the corresponding line part 100.

Further, the delivery information transmitter 510 operates cooperatively with the delivery number receiver 530, compares the number of delivery times by line part 100 counted by the counting parts 600, and transmits the compared results to the delivery information receivers 421 to allow the robot bodies 300 to be delivered sequentially from the units 200 of the line part 100 having the smallest number of delivery times.

Further, the units 200 are desirably formed of the sections Nos. 1 to N lined up by the compartment of each line part 100.

In this case, the driving controllers 430 of the control modules 400 are configured to allow the robot bodies 300 located on the section No. 1 to be first delivered forward from the line parts 100, based on the information received from the delivery information receivers 421.

If a number of robot bodies 300 are delivered according to the delivery information received from the delivery information receivers 421, they may collide against one another, and to prevent such collision, the robot bodies 300 are delivered sequentially in order of section numbers.

Further, each control module 400 includes an arrangement controller for moving the corresponding robot body 300 not delivered from the line part 100 where one or more robot bodies 300 are delivered through the driving controllers 430 to a direction toward the section No. 1 from the corresponding section thereof by the number of robot bodies 300 delivered from the corresponding line 100.

In specific, the arrangement controllers are adapted to move the robot bodies 300 not delivered yet to the sections on which the robot bodies 300 have been delivered forward from the line part 100 through the driving controllers 430 and to locate the robot bodies 300 on the sections. If the delivered robot bodies 300 are stored in the same sections again and delivered from the same sections again, the number of robot bodies 300 used is increased only in the adjacent sections on the front sides, thereby causing the number of times of use of the line parts 100 to be different according to the line parts 100. According to the present invention, the occurrence of the difference can be prevented by adopting the arrangement controllers.

Further, the driving controllers 430 are configured to store the robot bodies 300 incoming after delivered in the rear sides of the line parts 100 sequentially, based on the information received from the warehousing information receivers 423.

As the robot bodies 300 not delivered move to the front sides of the line parts 100 by means of the arrangement controllers, in specific, the robot bodies 300 incoming after delivered are stored sequentially in the rear sides of the line parts 100.

As described above, the autonomous driving mobile service robot warehousing and delivery system according to the present invention is configured to perform its original purpose of delivering the autonomous driving robot bodies from a car warehouse to move the robot bodies to the user, to systematically store and deliver the robot bodies located on the units of one or more line parts from the units by means of the server to thus provide many conveniences for customers, and to compare the number of delivery times of the robot bodies by line part through the counting parts to thus allow the robot bodies to be delivered sequentially from the line part having the smallest number of delivery times so that each robot body can be prevented from aging owing to its usage amount having a deviation in the number of delivery times of the robot bodies, and batteries for driving electric motors of the robot bodies can be extended in life span and other components of the robot bodies can be managed more systematically under uniform usage frequency of the robot bodies.

The present invention may be modified in various ways and may have several exemplary embodiments. Accordingly, it should be understood that the invention covers all the modifications, equivalents, and replacements within the idea and technical scope of the invention. Therefore, the present invention is not to be restricted by the embodiments as mentioned above. It is therefore intended that the scope of the invention be limited not by this detailed description, but rather by the claims appended hereto.

What is claimed is:

1. An autonomous driving mobile service robot warehousing and delivery system, the system comprising:

two or more line parts arranged in parallel;

robot bodies disposed on each line part and manually driven by a user's control or autonomously driven by control modules, wherein the robot bodies are indistinctive by the user;

the control modules disposed on the corresponding robot bodies to provide position information of the robot bodies, receive warehousing information and delivery information of the robot bodies from a server, and control driving of the robot bodies in response to the received warehousing information or the received delivery information to store the robot bodies in the line parts or deliver the robot bodies from the line parts;

the server configured to calculate information of the number of required robot bodies according to registration and usage information of the user, to transmit delivery information corresponding to the calculation to the control modules, to transmit warehousing information to the control modules according to the user's return request of the delivered robot bodies, to receive information of the number of delivery times from counting parts, to compare the number of delivery times by line part counted by the counting parts, and to transmit the compared results to the control modules to allow the required robot bodies to be delivered sequentially from a line part having the smallest number of delivery times; and the counting parts configured to count the number of delivery times of the robot bodies from the respective line parts to transmit the information of the number of delivery times to the server.

2. The system of claim 1, wherein each line part comprises units formed of sections Nos. 1 to N lined up by compartment thereof, the robot bodies being located on the units, and each control module comprises:

a sensor configured to provide position information of the corresponding robot body;

a receiver comprising a delivery information receiver configured to receive delivery information of the corresponding robot body from the server and a warehousing information receiver configured to receive warehousing information of the corresponding robot body from the server; and a driving controller configured to control driving of the corresponding robot body to deliver the corresponding robot body from the corresponding unit or store the corresponding robot body in the corresponding unit, based on the information received from the receiver.

3. The system of claim 2, wherein the server comprises:

a delivery information transmitter configured to calculate the information of the required number of robot bodies according to the registration and usage information of the user to transmit the delivery information corresponding to the calculation to the delivery information receivers;

a warehousing information transmitter configured to transmit the warehousing information to the warehousing information receivers according to the user's return request of the delivered robot bodies; and a delivery number receiver configured to receive the information of the number of delivery times from the counting parts, and wherein the delivery information transmitter is configured to operate cooperatively with the delivery number receiver, to compare the number of delivery times by line part counted by the counting parts, and to transmit the compared results to the delivery information receivers to allow the required robot bodies to be delivered sequentially from the units of the line part having the smallest number of delivery times.

4. The system of claim 3, wherein the driving controllers of the control modules are configured to allow the robot bodies located in the section No. 1 to be first delivered forward from the line parts, based on the information received from the delivery information receivers.

5. The system of claim 4, wherein each control module comprises an arrangement controller configured to move the corresponding robot body not delivered from the line part where one or more robot bodies are delivered through the driving controllers to a direction toward the section No. 1 from the corresponding section thereof by the number of robot bodies delivered from the corresponding line.

6. The system of claim 2, wherein the driving controllers are configured to store the robot bodies incoming after delivered in the rear sides of the line parts sequentially, based on the information received from the warehousing information receivers.

* * * * *